US010356261B2

(12) United States Patent
Yamada

(10) Patent No.: US 10,356,261 B2
(45) Date of Patent: Jul. 16, 2019

(54) IMAGE-FORMING APPARATUS WITH DOCUMENT READING UNIT THAT AUTOMATICALLY FEEDS AND READS DOCUMENTS

(71) Applicant: KYOCERA Document Solutions Inc., Osaka (JP)

(72) Inventor: Yohei Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/639,790

(22) Filed: Jun. 30, 2017

(65) Prior Publication Data
US 2018/0007222 A1    Jan. 4, 2018

(30) Foreign Application Priority Data

Jun. 30, 2016   (JP) .................................. 2016-129743

(51) Int. Cl.
*G06K 9/00* (2006.01)
*H04N 1/00* (2006.01)

(52) U.S. Cl.
CPC ..... *H04N 1/00663* (2013.01); *G06K 9/00469* (2013.01); *H04N 1/0032* (2013.01);
(Continued)

(58) Field of Classification Search
CPC ........... G06K 9/00469; G06K 9/00442; G06K 9/00463; G06K 9/00449; G06F 17/217;
(Continued)

(56) References Cited

U.S. PATENT DOCUMENTS 6,507,415 B1 * 1/2003 Toyoda ................ H04N 1/3876
358/450
2004/0119998 A1 * 6/2004 Xiong ................ H04N 1/00013
358/1.13
(Continued)

FOREIGN PATENT DOCUMENTS

JP   H07-237787 A   9/1995
JP   2007-221246 A   8/2007
(Continued)

OTHER PUBLICATIONS

Japan Patent Office. Office Action of foreign counterpart. dated Apr. 16, 2019.

*Primary Examiner* — Chad Dickerson
(74) *Attorney, Agent, or Firm* — Hawaii Patent Services; Nathaniel K. Fedde; Kenton N. Fedde

(57) ABSTRACT

Provided is an image-forming apparatus that is able to determine whether or not reading of a document ends properly without knowing the number of sheets of the document, and when overlapped feeding occurs, is able to estimate the location where overlapped feeding occurs. The image-forming apparatus has a document feeding unit that conveys a set document one sheet at a time, and a document reading unit that reads the conveyed document and obtains document image data. The image-forming apparatus includes an extraction-area-specifying unit that specifies part or all of the top and bottom margins of document image data as extraction areas, a number-image-extracting unit that respectively extracts the images in the extraction areas specified by the extraction-area-specifying unit as number images, and a number-image-summarizing unit that generates a number-verification page on which plural number images are summarized.

4 Claims, 9 Drawing Sheets

(52) U.S. Cl.
CPC ..... *H04N 1/00803* (2013.01); *H04N 1/00816* (2013.01); *H04N 2201/0094* (2013.01)

(58) Field of Classification Search
CPC .. G06F 17/2745; G06F 3/1242; G06F 3/1256; H04N 1/00663; H04N 1/0032; H04N 1/00803; H04N 1/00816; H04N 2201/0094
USPC ........ 358/1.11–1.18, 1.9, 2.1, 538, 450, 453, 358/448, 464, 403; 382/284, 176, 182; 715/251
See application file for complete search history.

(56) References Cited

U.S. PATENT DOCUMENTS

2008/0114757 A1\* 5/2008 Dejean .................. G06F 16/258
2013/0258419 A1\* 10/2013 Shimazu ............ G06K 9/00469
358/448

FOREIGN PATENT DOCUMENTS

JP 2008-153894 A 7/2008
JP 2014-017714 A 1/2014

\* cited by examiner

FIG.4B

NUMBER VERIFICATION  ☑ YES  ☐ NO

NUMBER-IMAGE-EXTRACTION AREA
☑ AUTO
☐ USER SETTING

EXTRACTION PAGE INTERVAL
☐ 2 PAGES
☑ 10 PAGES
☐ 20 PAGES

OUTPUT METHOD
☑ PRINT   ☐ PDF
☐ DISPLAY

SIMPLE SETTINGS 90, 51, 91, 92, 93, 94

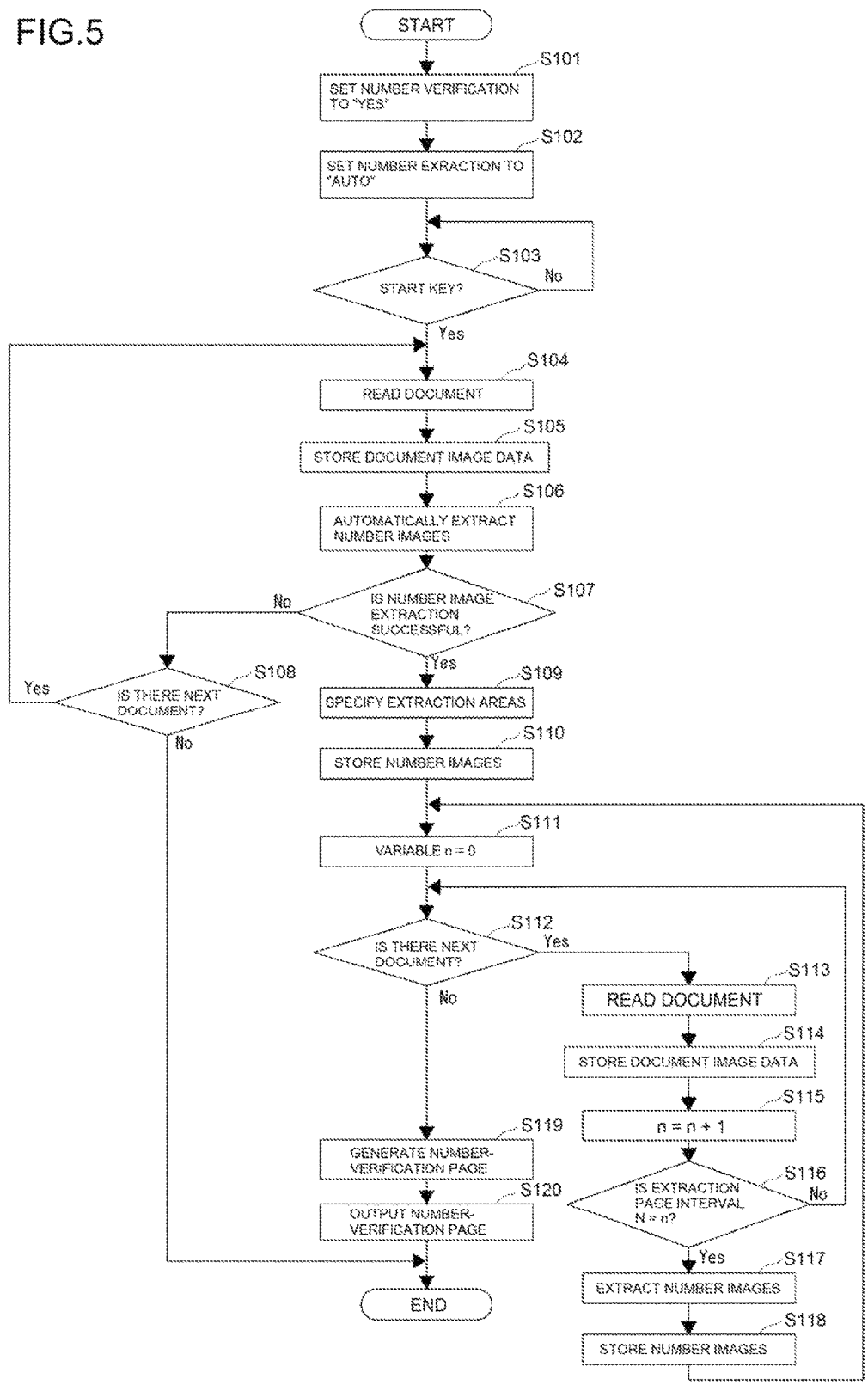

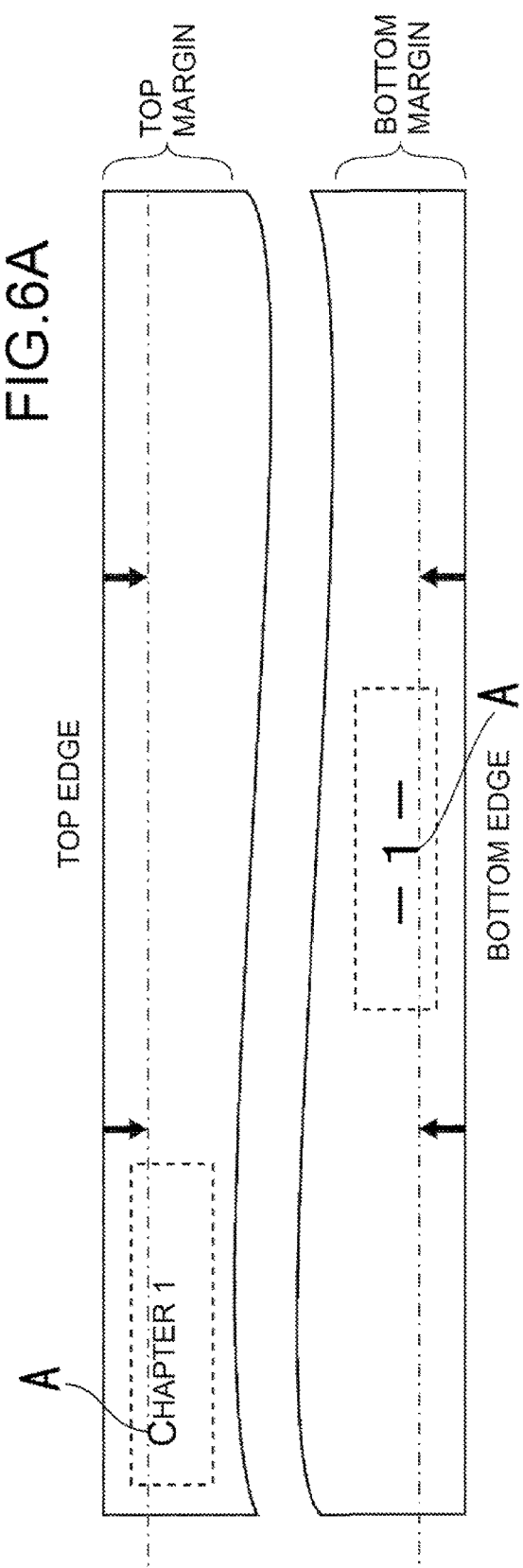

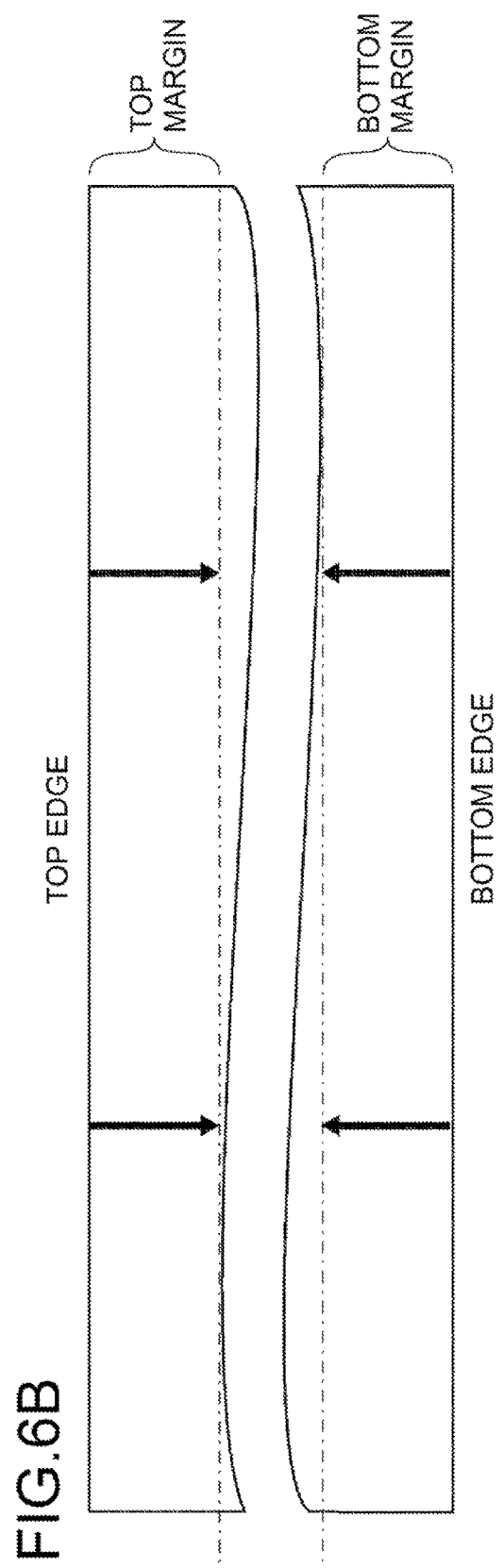

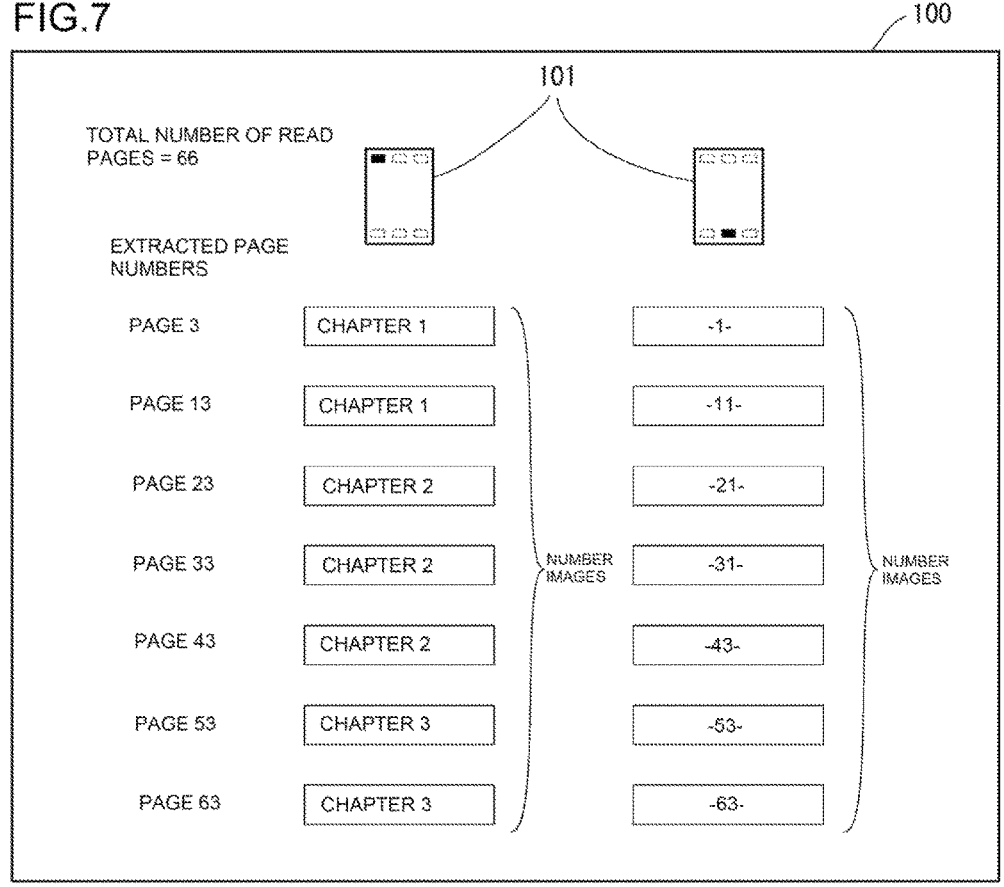

IMAGE-FORMING APPARATUS WITH DOCUMENT READING UNIT THAT AUTOMATICALLY FEEDS AND READS DOCUMENTS

INCORPORATION BY REFERENCE

This application is based on and claims the benefit of priority from Japanese Patent Application No. 2016-129743 filed on Jun. 30, 2016, the contents of which are hereby incorporated by reference.

BACKGROUND

The present disclosure relates to an image-forming apparatus that includes a document reading unit that automatically feeds and reads documents.

An image-forming apparatus such as a copier, a scanner, a multifunction peripheral and the like is often provided with a document feeding unit that is called an ADF (Auto Document Feeder) and a document reading unit. A document feeding unit stacks (sets) plural documents one on top of the other, and feeds the plural documents in order. A document reading unit reads documents that are fed by a document feeding unit. In this kind of image-forming apparatus, it is possible that overlapped feeding will occur and a few of the documents will be fed as is being stacked one on top of the other, so that some of the documents will not be read. Therefore, technology in which by counting and displaying the number of documents read by the document reading unit, it is possible to determine whether or not reading the documents ended properly, and technology for detecting the occurrence of overlapped feeding are proposed.

SUMMARY

The image-forming apparatus of the present disclosure is an image-forming apparatus having a document feeding unit and a document reading unit. The document feeding unit sequentially feeds a set document bundle one sheet at a time. The document reading unit reads documents that are conveyed by the document feeding unit, and obtains document image data. The image-forming apparatus includes an extraction-area-specifying unit, a number-image-extracting unit, and a number-image-summarizing unit. The extraction-area-specifying unit specifies part or all of the top and bottom margins of the document image data as extraction areas. The number-image-extracting unit respectively extracts images in the extraction areas that are specified by the extraction-area-specifying unit from the plurality of document image data that is obtained by the document reading unit as number images. The number-image-summarizing unit generates a number-verification page on which the plural number images that are extracted by the number-image-extracting unit are summarized.

BRIEF DESCRIPTION OF THE DRAWINGS

FIG. 4B illustrates an example of a number verification setting screen that is displayed on the touch panel illustrated in FIG. 1.

FIG. 5 is a flowchart explaining the number verification operation of an embodiment of the image-forming apparatus of the present disclosure.

FIG. 6A is an explanatory diagram explaining an example of extracting a number image by the extraction-area-specifying unit illustrated in FIG. 3.

FIG. 6B is an explanatory diagram explaining an example of extracting a number image by the extraction-area-specifying unit illustrated in FIG. 3.

FIG. 7 illustrates an example of a number-verification page that is created by the number-image-summarizing unit illustrated in FIG. 3.

DETAILED DESCRIPTION

Next, an embodiment of the present disclosure will be explained in detail with reference to the drawings.

Figure 1:
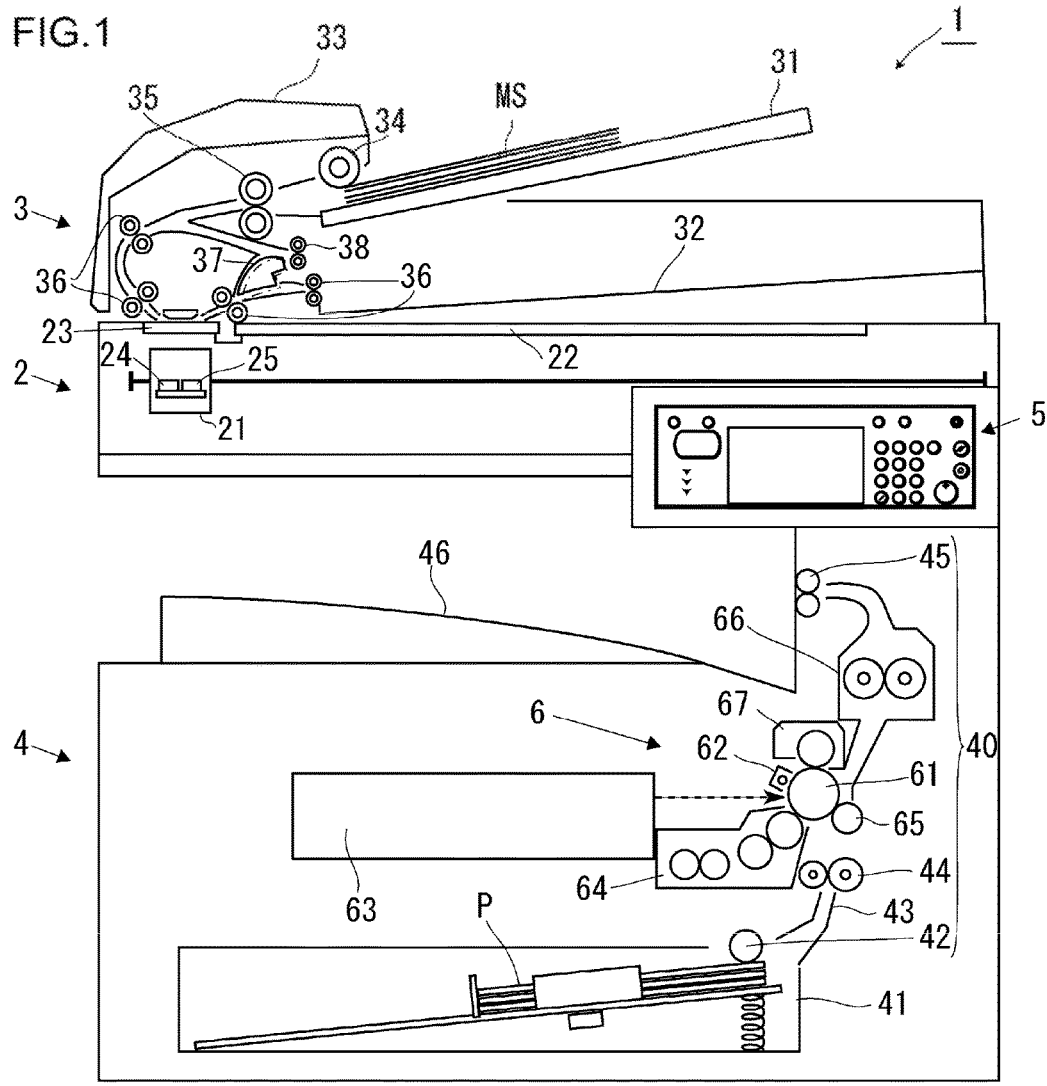
FIG. 1 is a cross-sectional schematic view illustrating the internal configuration of an embodiment of an image-forming apparatus of the present disclosure.

This embodiment is an image-forming apparatus 1 such as a copier, a scanner, a multifunction peripheral, and the like that includes a scanning function. When reading a document bundle (for example, a book, magazine or the like that is cut the gutter section) on which numbers (page numbers) are printed, the image-forming apparatus 1 includes a function for verifying whether or not reading documents ends properly according to the read numbers. Referring to FIG. 1, the image-forming apparatus 1 includes a document reading unit 2, a document feeding unit 3, a main unit 4 and an operation unit 5. The document reading unit 2 is arranged on an upper portion of the main unit 4, and the document feeding unit 3 is arranged on an upper portion of the document reading unit 2.

Figure 2:
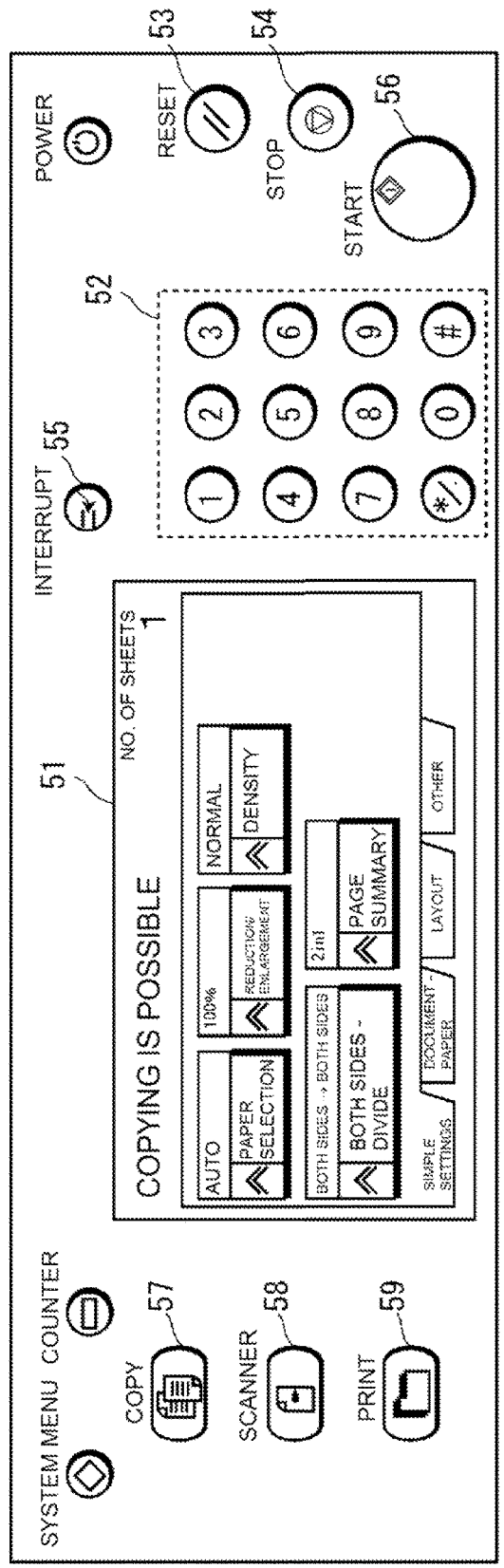
FIG. 2 illustrates the configuration of the control unit illustrated in FIG. 1.

The operation unit 5 for performing settings and operation instructions for the image-forming apparatus 1 is arranged on the front side of the image-forming apparatus 1. Referring to FIG. 2, the operation unit 5 includes various keys such as a touch panel 51, a ten-key 52, a reset key 53, a stop key 54, an interrupt key 55, a start key 56 and the like. The touch panel 51 is such that transparent pressure-sensitive sensors are provided on the surface of a liquid-crystal display panel. Numerical values such as the number of sheets to be printed and the like are inputted using the ten-key 52. An instruction to initialize the setting information is inputted using the reset key 53. The stop key 54 stops the copying function and deletes the inputted numerical values. The interrupt key 55 gives an instruction for an interrupt copy. An output instruction that starts the printing operation is inputted using the start key 56.

Moreover, the operation unit 5 includes as mode switching keys, a copy key 57, a scanner key 58, and a print key 59. An instruction for the copying function is given by using the copy key 57. An instruction for the scanning function is given by using the scanner key 58. An instruction for the printing function is given by using the print key 59. Operation screens that correspond to the function modes for which instructions are given by using these mode-switching keys are displayed on the touch panel 51. The copying function is a mode for printing the image data of a document MS that is read by the document reading unit 2 onto printing paper P. Moreover, the scanning function is a mode for storing image data of a document MS that is read by the document reading unit 2 in a storage unit. Furthermore, the printing function is a mode for printing image data that is stored in the storage unit onto printing paper P.

Referring to FIG. 1, the document reading unit 2 includes a scanner 21, a platen glass 22, and a document-reading slit 23. The scanner 21 includes a light source 24 that uses an LED (Light Emitting Diode), and a light receiving unit 25 that includes a CCD (Charge Coupled Device) line sensor, a CMOS (Complementary Metal Oxide Semiconductor) line sensor or the like. The scanner 21 is configured so as to be able to move in the conveyance direction in which the document MS is conveyed by the document feeding unit 3. The platen glass 22 is a document table and includes a transparent member such as glass. The document-reading slit 23 is a slit that is formed in a direction that is orthogonal to the conveyance direction in which the document MS is conveyed by the document feeding unit 3.

The document feeding unit 3 is an automatic document-feeding device called an ADF (Auto Document Feeder), and includes a document-placement unit 31, a document-discharge unit 32 and a document-conveying mechanism 33. Documents MS that are set in the document-placement unit 31 are extracted one by one by the document-conveying mechanism 33 and conveyed to a position that faces the document-reading slit 23, and then discharged by the document-discharge unit 32. The document feeding unit 3 and the document reading unit 2 are connected along the rear side of the image-forming apparatus 1 by a hinge mechanism, and the document feeding unit 3 functions as a platen cover that opens and closes the top surface of the platen glass 22. By opening the document feeding unit 3 in the upward direction, the top surface of the platen glass 22 is opened to a state in which a document MS can be set on the platen glass 22.

The document-conveying mechanism 33 includes a pick-up roller 34, paper-supply rollers 35, conveying rollers 36, a switching claw 37, and reversing rollers 38. A document MS that is picked up from the document-placement unit 31 by the pick-up roller 34 is supplied to the plural conveying rollers 36 that are arranged along the document-conveying path. Then, the document MS is conveyed by the conveying rollers 36 to a position that faces the document-reading slit 23. As a result, the front surface of the document MS is read.

The switching claw 37 is attached so as to be able to rotate, and switches the conveying destination of a document MS to either the document-discharge unit 32 or the reversing rollers 38. The reversing rollers 38 are rollers for reversing the document conveyance direction of the document MS from forward to backward, and can be switched between forward or reverse rotation. A document MS, the document conveyance direction of which has been reversed from forward to backward by the reversing rollers 38, is returned in a state in which the front and back have been reversed to a position further on the upstream side of the document conveyance direction than the document-reading slit 23, and then is conveyed by the conveying rollers 36 to a position that faces the document-reading slit 23. As a result, the back surface of the document MS is read.

When an instruction to read a document MS is given by using the start key 56 of the operation unit 5 in a state in which a document MS is not set in the document-placement unit 31, or in a state in which the document feeding unit 3 (platen cover) is open, a document MS that is set on the platen glass 22 will be read. When reading a document MS that is set on the platen glass 22, the scanner 21 moves to a position that faces the platen glass 22. The scanner 21 reads the document MS that is set on the platen gass 22 while scanning along a sub-scanning direction reference line B in the sub-scanning direction that is orthogonal to the main scanning direction, and obtains the document image data, then outputs the obtained document image data to main unit 4.

When an instruction to read a document MS is given by using the start key 56 of the operation unit 5 when a document MS is set in the document-placement unit 31, the scanner 21 moves to a position that faces the document-reading slit 23. The scanner 21 reads the document MS that is conveyed by the document feeding unit 3 via the document-reading slit 23. The scanner 21 obtains the document image data by reading the document MS in synchronization with the conveying operation by the document feeding unit 3, and outputs the obtained document image data to the main unit 4. A document MS is set in the document-placement unit 31 with the front surface (surface from which the document image is to be read) on top. The document MS that is set in the document-placement unit 31 is then conveyed from left side by the document feeding unit 3, and guided to a position where the front surface of the document MS faces the document-reading slit 23.

Together with including a printing unit 6, the main unit 4 includes a paper-supply unit 41, a paper-supply roller 42, a paper-conveying path 43, conveying rollers 44 and discharge rollers 45. The paper-supply unit 41 is a paper-supply cassette in which plural sheets of printing paper P are stored, and the paper-supply roller 42 feeds printing paper P from the paper-supply unit 41 to the paper-conveying path 43 one sheet at a time. The printing paper P that is fed to the paper-conveying path 43 by the paper-supply roller 42 is conveyed to the printing unit 6 by the conveying rollers 44. Then the printing paper P on which printing is performed by the printing unit 6 is discharged by the discharge rollers 45 to a discharge space 46 that is formed between the document reading unit 2 and the main unit 4. In this way, the paper-supply roller 42, the conveying rollers 44 and the discharge rollers 45 function as a conveying unit 40 for the printing paper P.

The printing unit 6 includes a photosensitive drum 61, a charging unit 62, an exposing unit 63, an image-forming unit 64, a transfer unit 65, a fixing unit 66, and a cleaning unit 67. The exposing unit 63 is an optical unit that includes a laser device, mirrors and the like, and based on document image data, outputs laser light and exposes the photosensitive drum 61 that is uniformly charged by the charging unit 62, and forms an electrostatic latent image on the surface of the photosensitive drum 61. The image-forming unit 64 is a developing unit that uses toner to develop the electrostatic latent image that is formed on the photosensitive drum 61, and forms a toner image on the photosensitive drum 61 based on the electrostatic latent image. The transfer unit 65 transfers the toner image that is formed on the photosensitive drum 61 by the image-forming unit 64 to the printing paper P. The fixing unit 66 fixes the toner image on the printing paper P by heating the printing paper P to which the toner image is transferred by the transfer unit 65. Then, the toner that remains on the photosensitive drum 61 is removed by the cleaning unit 67.

Figure 3:
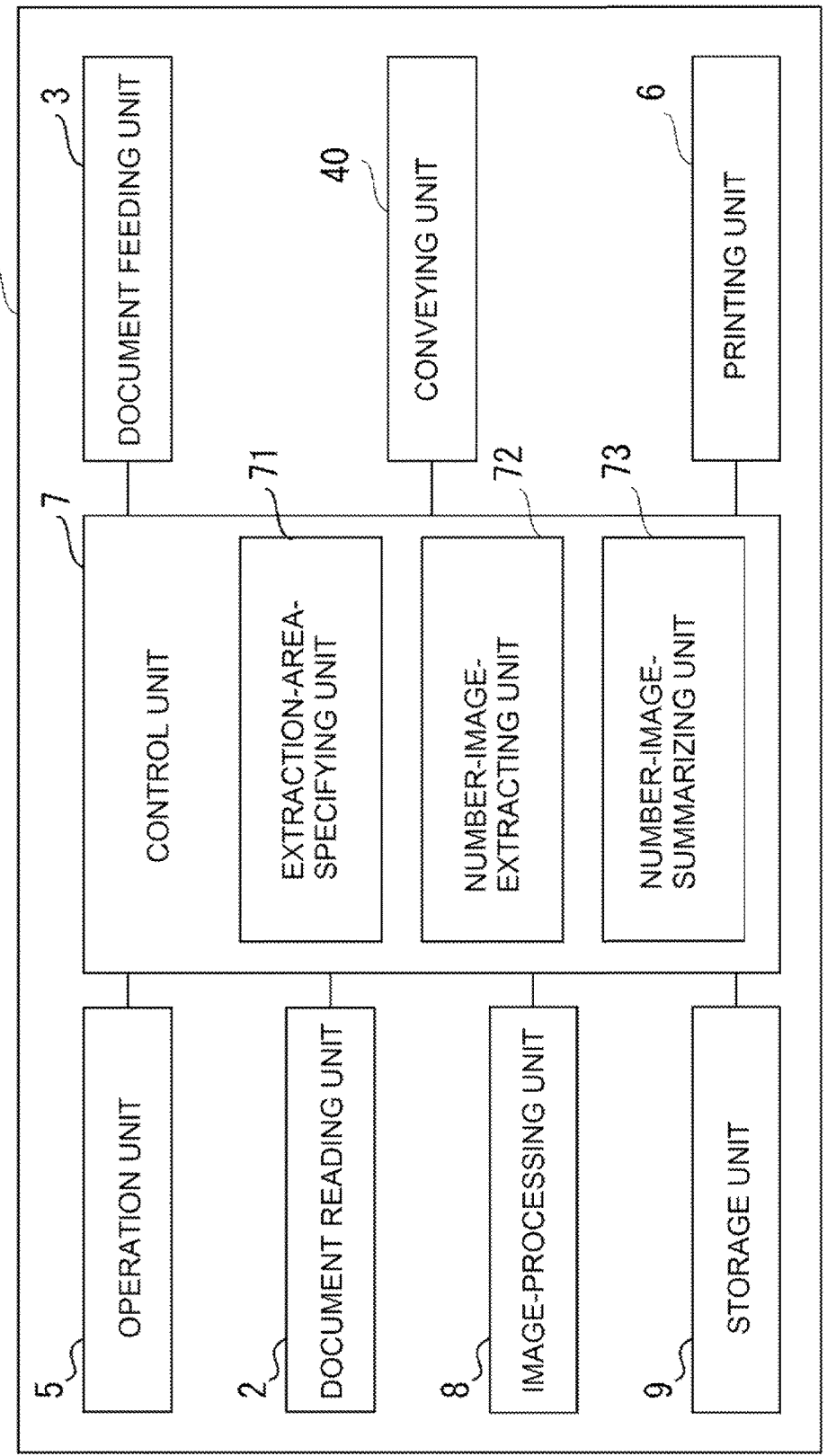
FIG. 3 is a block diagram schematically illustrating the configuration of the image-forming apparatus illustrated in FIG. 1.

FIG. 3 is a block diagram schematically illustrating the image-forming apparatus 1. The document reading unit 2, document feeding unit 3, conveying unit 40 (paper-supply roller 42, conveying rollers 44 and discharge rollers 45), operation unit 5 and printing unit 6 are connected to a control unit 7, and the operation is controlled by the control unit 7. Moreover, an image-processing unit 8 and storage unit 9 are connected to the controller 7.

The image-processing unit 8 performs specific image processing of the document image data. The image-processing unit 8 for example, performs a rotation process, enlargement or reduction process, image improvement processes such as tone adjustment, density adjustment, and the like.

The storage unit 9 is storage unit such as a semiconductor memory, HDD (Hard Disk Drive) or the like, and stores document image data that is obtained by the document reading unit 2 readings a document MS, as well as stores various kinds of management information.

The control unit 7 is an information processing unit such as a microcomputer or the like that includes a CPU (Central Processing Unit), ROM (Read Only Memory), RAM (Random Access Memory) and the like. The ROM stores a control program for controlling the operation of the image-forming apparatus 1. The control unit 7 reads the control program that is stored in the ROM, and by expanding that control program in the RAM, performs overall control of the image-forming apparatus according to specific instruction information that is inputted from the operation unit 5. Moreover, the control unit 7 functions as an extraction-area-specifying unit 71, a number-image-extracting unit 72, and a number-image-summarizing unit 73.

Next, the number detection operation of the image-forming apparatus 1 of this embodiment will be explained in detail with reference to FIG. 4A to FIG. 6B.

Figure 4A:
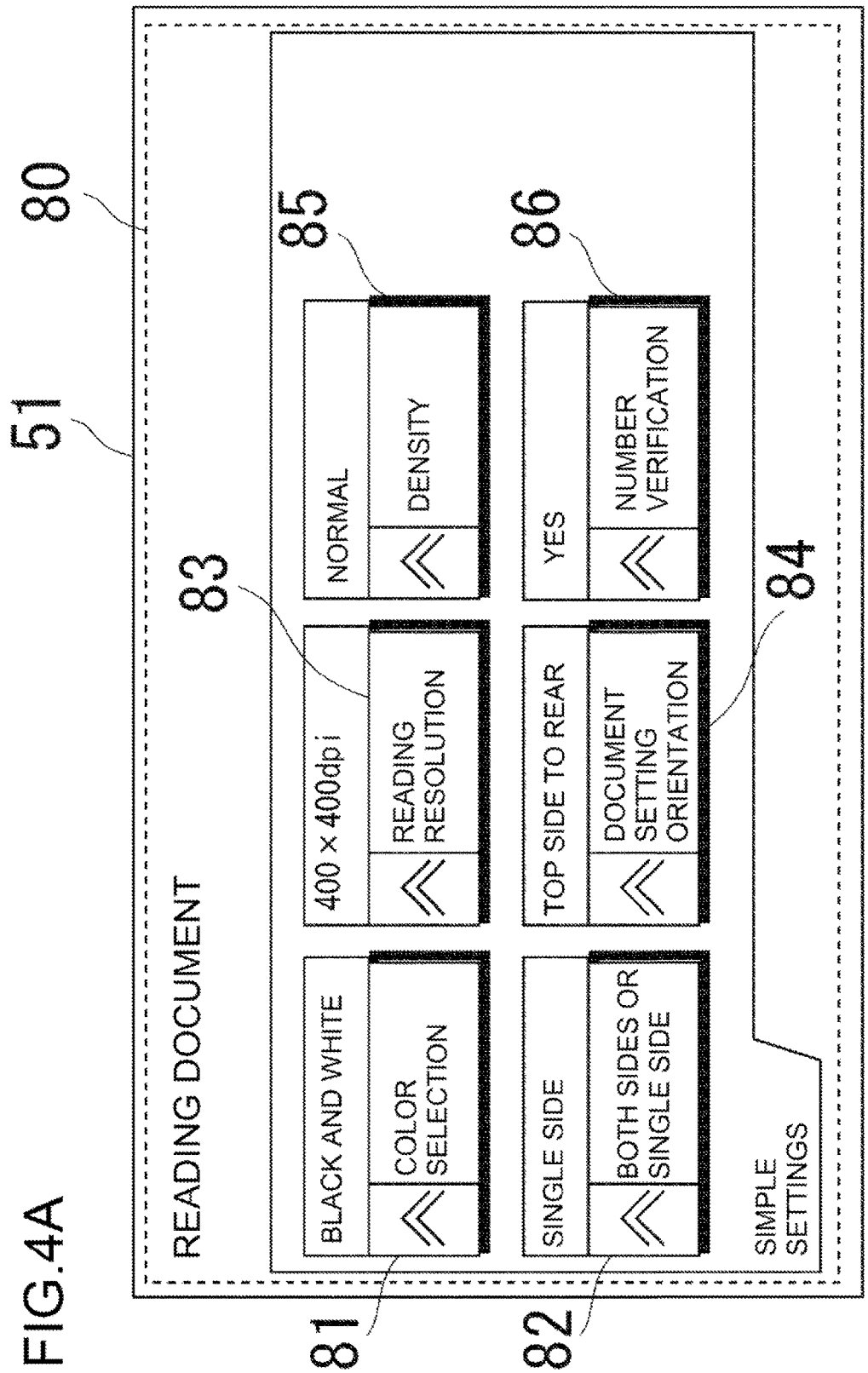
FIG. 4A illustrates an example of a document reading screen that is displayed on the touch panel illustrated in FIG. 1.

The user sets documents MS in the document-placement unit 31 of the document feeding unit 3, and by operating the scanner key 58 of the operation unit 5, the control unit 7 causes a document-reading screen 80 as illustrated in FIG. 4A to be displayed on the touch panel 51. The document-reading screen 80 is a screen for receiving various settings for scanner operation. The document-reading screen 80 includes a color-selection key 81, a reading-surface-selection key 82, a reading-resolution-selection key 83, a document-setting-orientation-selection key 84, a density-selection key 85, and a number-verification-setting key 86. The reading color (black and white, or color) is selected using the color-selection key 81. The reading surface (both sides or single side) is selected using the reading-surface-selection key 82. The reading resolution (150 dpi, 300 dpi, and the like) is selected using the reading-resolution-selection key 83. The document setting orientation (top side up, top side to the left, or the like) is selected using the document-setting-orientation-selection key 84. The document density (dark, normal, light) is selected using the density-selection key 85.

By the user operating the number-verification-setting key 86 on the document-reading screen 80, the control unit 7 causes a number-verification-setting screen 90 to be displayed on the touch panel 51, and various settings for number verification can be received. A number-verification YES/NO setting field 91, an extraction-area-setting field 92, an extraction-page-interval-setting field 93, and an output-method-setting field 94 are provided on the number-verification-setting screen 90. Whether or not to perform number verification (YES/NO) is set using the number-verification YES/NO setting field 91. The method for specifying the extraction area of the number image is set using the extraction-area-setting field 92. The interval for extracting number images is set using the extraction-page-interval-setting field 93. The output method for outputting the number-summarizing page as a result of number verification is set using the output-method-setting field 94.

In the following, the number verification operation when number verification is set to "YES" in the number verification YES/NO setting field 91 and the method for specifying the extraction-area is set to "Auto" in the extraction-area-setting field 92 will be explained (steps 101, 102).

The control unit 7 monitors the operation of the start key 56 (step 103), and when the start key 56 is operated, the control unit 7 causes the document feeding unit 3 to feed and convey a document MS. The control unit 7 causes the document reading unit 2 to read the document MS (step 104), and and stores the read document image data in the storage unit 9 (step 105).

Next, the control unit 7 functions as an extraction-area-specifying unit 71 and performs an extraction-area-specifying operation that specifies extraction areas for extracting number images (step 106 to step 109). Numbers are typically printed in a portion of the top and bottom margin that is separated from the main body. Therefore, the extraction-area-specifying unit 71 automatically extracts number images from the top and bottom margin of the document image data (step 106). Automatic extraction of number images starts from the top edge of the read document image data, and searches the area in the top or bottom margin portion where the first characters appear. For example, as illustrated in FIG. 6A, black points A that are equal to or greater than a threshold value that are present in the top margin are searched for starting from the top edge and moving downward, and the image of a specific area that includes the black points A that are found first is extracted as a number image. At the same time, black points A that are equal to or greater than a threshold value that are present in the bottom margin are searched for starting from the bottom edge and moving upward, and the image of a specific area that includes the black points A that are found first is extracted as a number image. The area of the top and bottom margins where number images are extracted may be set in advance or may be set by the user.

In a line, a number is often placed on the edge, so several characters should be extracted from the edge. Therefore, it is necessary to recognize the "gutter" and the "edge" of pages. Typically, in a document that is written horizontally, the left side of odd pages is the "gutter" and the right side is the "edge", and opposite this in the case of documents that are written vertically, so by distinguishing whether a document MS is vertically written or horizontally written, it is possible to recognize the "gutter" and the "edge". Distinguishing vertical writing and horizontal writing can be set by the user from a setting screen, or can be determined by analyzing the document image data. Moreover, when a document MS is spread open, the outside can be recognized as the edge.

Next, the extraction-area-specifying unit 71 determines whether or not number images in the top and bottom margins could be extracted (step 107). As illustrated in FIG. 6B, when black points A that are equal to or greater than a threshold value are not found in either the top or bottom margins, and number images are not extracted, the control unit 7 determines whether or not there is a next document MS, or in other words, determines whether or not there is a document MS placed in the document-placement unit 31 of the document feeding unit 3 (step 108). In step 108, when there is a next document MS, processing returns to step 104, and the document feeding unit 3 feeds and conveys the next document MS, and the document reading unit 2 reads the document MS. Numbers maybe omitted on the table of contents page, blank pages, pages with figures, and the like, so in the case of such pages, it is not possible to extract a number image. Therefore, documents MS are sequentially read until a page is reached from which a number image can be extracted at first. In step 108, when there is no next document MS, reading of all pages ends without extracting the number image, and the control unit 7 ends the number-verification operation.

In step 107 when it is possible to extract a number image from either the top margin or the bottom margin or from both, the extraction-area-specifying unit 71 specifies the area where the number image is extracted as the extraction area (step 109). The area where the number image is extracted is only a location where it is presumed that the number image is a number, as illustrated in the top margin portion in FIG. 6A, the extracted number image may not be an effective number. Therefore, when number images are extracted from both the top and bottom margins, the extraction-area-specifying unit 71 specifies both the top and bottom margins as extraction areas.

Next, the extraction-area-specifying unit 71 correlates the extracted number images with the extracted page numbers and extraction areas, and stores thesein the storage unit 9 (step 110). When the method for specifying an extraction area is set to "User Setting" in the extraction-area-setting field 92, the extraction-area-specifying unit 71 instead of the extraction- area-specifying operation in steps 106 to 109, specifies the "User Setting" as the extraction area. Images in the specified extraction areas are extracted as number images, and stored in the storage unit 9.

Next, the control unit 7 functions as a number-image-extracting unit 72. The number-image-extracting unit 72 sets a variable "n" to 0 (step 111), and determines whether or not there is a document MS, or in other words, determines whether or not a document MS is placed in the document-placement unit 31 of the document feeding unit 3 (step 112).

In step 112, when there is a next document MS, the number-image-extracting unit 72 causes the document feeding unit 3 to feed and convey the document MS, and the document reading unit 2 reads the document MS (step 113). The number-image-extracting unit 72 stores the read document image data in the storage unit 9 (step 114), and increments the variable "n" (step 115).

Next, the number-image-extraction unit 72 determines whether or not the variable "n" has reached the extraction page interval N that is set in the extraction-page-interval-setting field 93 (step 116). In step 116, when the variable "n" has not reached the extraction page interval N, processing returns to step 112, and the control unit 7 determines whether or not there is a next document MS.

In step 116, when the variable "n" has reached the extraction page interval N, the number-image-extraction unit 72 extracts the images in the extraction areas that are specified by the extraction-area-specifying unit 71 in step 109 as number images (step 117). The number-image-extraction unit 72 correlates the extracted number images with the number of extracted pages and the extraction areas, and stores these in the storage unit 9 (step 118), after which processing returns to step 111. The execution page interval N that can be set in the extraction-page-interval-setting field 93 is an even number such as 2, 10 and 20 pages as illustrated in FIG. 4B. When the location of the number described is on the edge side, the location becomes different for odd pages and even pages. Therefore, by presuming that the extraction page interval N is an even number, it is possible to extract number images from only odd pages, or from only even pages, and it is not necessary to change the extraction area of odd pages and even pages.

In step 112, when there is no next document MS, the control unit 7 functions as the number-image-summarizing unit 73, and generates a number-verification page 100 that summarizes the number images stored in the storage unit 9 (step 119). As illustrated in FIG. 7, the number-image-summarizing unit 73 correlates and arranges the extraction page numbers and the number images on the number-verification page 100, as well as separates and arranges the number images for each extraction area. Moreover, the total pages read, and an indicator 101 indicating the extraction area are also arranged on the number-verification page 100.

Next, the number-image-summarizing unit 73 outputs the number-verification page 100 that is generated in step 119 to an output destination that is set in the output-method-setting field 94 (step 120), and ends the number-verification operation.

On the number-verification page 100 illustrated in FIG. 7, an example is illustrated in which a number image is first extracted on the third page, and after that, number images are extracted at each extraction interval of N=10 pages. According to this, the user understands that number images that are extracted from the center portion of the bottom margins are effective numbers. When the extraction page number=page 3 to page 33, and when the extraction page number=page 43 to page 63, the numbers that are extracted as number images are also at intervals of 10 pages, so it is known that reading of the document MS is performed properly. However, when the extraction number=page 33 to page 43, the numbers that are extracted as number images at an invterval of 12 pages. As a result, the user is able to know that there is a possibility that overlapped feeding occurred between page 31 to page 43 of the document MS, and by verifying the document image data that is read in this range and the document MS, the location where overlapped feeding occurred can be easily identified. Therefore, even though the number of pages of a document MS may not be known beforehand, it is possible to determine whether or not reading of the document MS has ended properly, and when overlapped feeding occurs, it is possible to get an idea of the location where the overlapped feeding occurred.

When the image-forming apparatus 1 includes a large touch panel 51, the position of the number (whether at the top portion or the bottom, how many characters to extract, whether a special algorithm (remove from the gutter side)) can be displayed using a sample on the touch panel 51 after scanning is started, and interactive instructions can be received. Moreover, in this embodiment, configuration is such that in the document image data, parts of both the top margin and bottom margin are specified as extraction areas, however, configuration can also be such that the entire top margin or the entire bottom margin or both are specified as extraction areas. Furthermore, in this embodiment, configuration is such that only the page where a number image is first automatically extracted is specified as an extraction area, however, it is also possible to automatically extract number images on plural pages and specify an extraction range so that the variation in the position of the number images among the plural pages is a minimum.

As was explained above, this embodiment is an image-forming apparatus 1 that has a document feeding unit 3 and document reading unit 2. The document feeding unit 3 sequentially conveys a set bundle of documents MS one sheet at a time. The document reading unit 2 reads the documents MS that are conveyed by the document feeding unit 3 and obtains document image data. The image-forming apparatus 1 includes an extraction-area-specifying unit 71, a number-image-extracting unit 72 and a number-image-summarizing unit 73. The extraction-area-specifying unit 71 specifies part or all of the top and bottom margins in the document image data as extraction areas. The number-image-extracting unit 72 extracts images in the extraction areas specified by the extraction-area-specifying unit 71 from a plurality of document image data that is obtained by the document reading unit 2 as number images. The number-image-summarizing unit 73 generates a number-verification page 100 that summarizes plural number images that are extracted by the number-image-extracting unit 72.

With this configuration, by looking at the plural number images that have been summarized on a number-verification page 100, it is possible to determine whether or not reading of the documents MS has ended properly without knowing the number of documents beforehand. Moreover, when overlapped feeding occurs, from the plural number images it is possible to get an idea of the location where overlapped feeding occurred, and by verifying the read document image data and the documents MS in that estimated range, it is possible to easily identify the location where overlapped feeding occurred.

Furthermore, in this embodiment, the number-image-summarizing unit 73 generates a number-verification page 100 on which number images and extracted extraction page number are correlated and arranged.

With this configuration, it is possible easily find discrepancies between the extraction page numbers and the numbers.

Furthermore, in this embodiment, when the extraction-area-specifying unit 71 specifies plural extraction areas, the number-image-summarizing unit 73 generates a number-verification page 100 on which number images are divided by each extraction area.

With this configuration, it is possible to easily compare only effective numbers even when number images that are not effective numbers are included.

Furthermore, in this embodiment it is possible to set an extraction page interval in which number images are extracted from document image data.

With this configuration, it is possible for the user to select the required operation load for number verification.

Furthermore, in this embodiment the extraction-page interval that can be set is an even number.

With this configuration, it is possible to extract number images from only odd pages or from only even pages, so it is not necessary to change the extraction area for odd pages and even pages.

Furthermore, in this embodiment, the extraction-area-specifying unit 71 starts from the top edge of document image data and moves downward in searching for black points A that are equal to or greater than a threshold value and that are located in the top margin. The extraction-area-specifying unit 71 specifies the first area found that includes a black point A as an extraction area, and then starts from the bottom edge of document image data and moves upward in searching for black points A that are equal to or greater than a threshold value and that are located in the bottom margin, and specifies the first area found that includes a black point A as an extraction area.

With this configuration, it is possible to automatically set extraction areas.

Typically, in technology that makes it possible to determine whether or not reading of a document has ended properly, it is necessary to know the number of sheets of the document beforehand, and as the number of sheets of a document increases, the burden for counting the number of sheets of a document also increases. When, the number of sheets of a document that is read by the document reading unit is different than the number of sheets of the document, there is a problem in that it is not possible to know where overlapped feeding has occurred. Moreover, in technology that detects the occurrence of overlapped feeding, there is a problem in that it is not possible to verify that overlapped feeding did not occur even though overlapped feeding is detected, so it is not possible to determine whether or not reading of the document has ended properly.

According to this disclosure, by looking at plural number images that have been summarized as a number-verification page, there is an advantage in that it is possible to determine whether or not reading of a document has ended properly even without knowing the number of sheets of the document beforehand. Moreover, when overlapped feeding occurs, by the plural number images it is possible to get an idea of the location where overlapped feeding occurs, and by verifying the read document image data with the document within the estimated range, it is possible to easily specify the location where overlapped feeding occurs.

The present disclosure is not limited to the embodiments described above, and it is evident that the embodiments can be appropriately modified within the scope of the technical idea of the present disclosure. Moreover, the number, positions, shapes and the like of the components described above are not limited to those in the embodiments described above, and when embodying the present disclosure, suitable numbers, positions, shapes and the like can be implemented. In the figures, the same reference numbers are used for the same components.

What is claimed is:

1. An image-forming apparatus having a document feeding unit that sequentially feeds a set document bundle one sheet at a time, and a document reading unit that reads documents that are conveyed by the document feeding unit, and obtains document image data; and comprising:
    an extraction-area-specifying unit that specifies part or all of the top and bottom margins of the document image data as extraction areas;
    a number-image-extracting unit that respectively extracts images in the extraction areas that are specified by the extraction-area-specifying unit from a plurality of document image data that is obtained by the document reading unit as number images; and
    a number-image-summarizing unit that generates a number-verification page on which plural number images that are extracted by the number-image-extracting unit are summarized,
    wherein
    the number-verification page lists, for each of said plural number images, an extraction page number, wherein the extraction page number corresponds to an actual sheet order in which the respective document was read;
    the plural number images and the listing of the extracted pages numbers are arranged on the number-verification page such that each of the plural number images is correlated with the respective extracted page number;
    the number-verification page comprises an indicator that indicates a respective extraction area from which the plural number images were extracted; and
    the image-forming apparatus makes it possible to set an extraction page interval in which the number images are extracted from the document image data such that the number-verification page does not comprise number images for documents of the document bundle that are skipped by said extraction page interval.

2. The image-forming apparatus according to claim 1, wherein
    when plural extraction areas are specified by the extraction-area-specifying unit, the number-image-summarizing unit generates the number-verification page on which the number images are divided for each of the extraction areas.

3. The image-forming apparatus according to claim 1, wherein the settable extraction page interval is an even number.

4. The image-forming apparatus according to claim 1, wherein the extraction-area-specifying unit starts from a top edge of the document image data and moves downward in searching for black points in the top margin that are equal to or greater than a threshold value, and specifies a specified area that includes the black points found first as an extraction area, and starts from a bottom edge of the document image data and moves upward in searching for black points in the bottom margin that are equal to or greater than a threshold value, and specifies a specified area that includes the black points found first in the bottom margin as an extraction area.

\* \* \* \* \*